Figure 1:
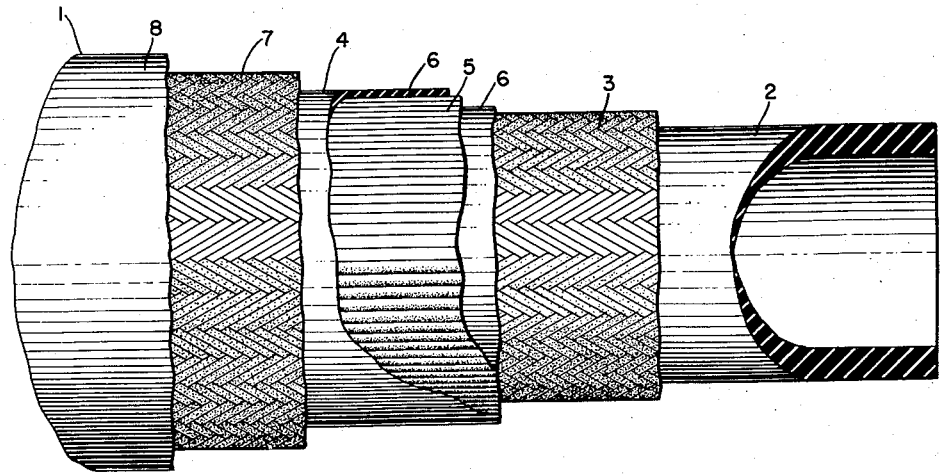

Aug. 18, 1959  D. E. HARPFER  2,899,982
HYDRAULIC BRAKE HOSE
Filed June 25, 1957

INVENTOR.
DONALD E. HARPFER
BY
*R. L. Miller*
ATTORNEY though a little more slowly and for a greater number of periods, in hydraulic systems have become more severe. In hydraulic systems, particularly those dealing with the braking system of modern high-speed, high-powered automobiles, the conduits used to transmit hydraulic pressures must be capable of withstanding extremely high internal pressures which produce both transverse and longitudinal stresses on the conduit. In instances where an automobile must be braked from high speed to low in a short space of time, the stresses placed on a hydraulic brake hose are not only high but suddenly applied and, hence, the hose must also withstand pressure shock as well as static stresses. Furthermore, the hoses on an automobile are subject to extreme flexure as the chassis and wheels vibrate relative to one another due to bumps in the highway or other causes and must therefore exhibit high flex life. High temperature is yet another condition under which a hydraulic brake hose must operate since braking by means of friction type drum or disk brakes results in the generation of extreme heat. In order to meet the demands of hydraulic braking systems, hose constructions utilizing laminated tubular structures composed of elastomers and textile and other reinforcing elements have been developed. However, many of the materials available for such use have not been utilized to take advantage of their desirable characteristics due to other weakness inherent in the materials and the failure of the art to devise ways to minimize these weaknesses while retaining the full advantage of the good characteristics.

United States Patent Office 2,899,982
Patented Aug. 18, 1959

2,899,982

HYDRAULIC BRAKE HOSE

Donald E. Harpfer, Akron, Ohio, assignor to The Goodyear Tire & Rubber Company, Akron, Ohio, a corporation of Ohio Application June 25, 1957, Serial No. 667,796

8 Claims. (Cl. 138—55)

This invention relates generally to hose for use in high pressure fluid systems and in particular to hydraulic brake hose.

As modern vehicular transportation has increased its speed and the environmental conditions under which it must operate have become more drastic, the demands placed on auxiliary components have become increasingly more severe. In hydraulic systems, particularly those dealing with the braking system of modern high-speed, high-powered automobiles, the conduits used to transmit hydraulic pressures must be capable of withstanding extremely high internal pressures which produce both transverse and longitudinal stresses on the conduit. In instances where an automobile must be braked from high speed to low in a short space of time, the stresses placed on a hydraulic brake hose are not only high but suddenly applied and, hence, the hose must also withstand pressure shock as well as static stresses. Furthermore, the hoses on an automobile are subject to extreme flexure as the chassis and wheels vibrate relative to one another due to bumps in the highway or other causes and must therefore exhibit high flex life. High temperature is yet another condition under which a hydraulic brake hose must operate since braking by means of friction type drum or disk brakes results in the generation of extreme heat. In order to meet the demands of hydraulic braking systems, hose constructions utilizing laminated tubular structures composed of elastomers and textile and other reinforcing elements have been developed. However, many of the materials available for such use have not been utilized to take advantage of their desirable characteristics due to other weakness inherent in the materials and the failure of the art to devise ways to minimize these weaknesses while retaining the full advantage of the good characteristics.

Therefore, it is an object of this invention to provide a hose for high pressure use which withstands severe conditions of stress, flexure and temperature.

It is an additional object of this invention to provide a hose made of materials whose superior characteristics are utilized to the maximum degree and which cooperate to minimize the effect of the inferior properties inherent therein.

Figure 2:
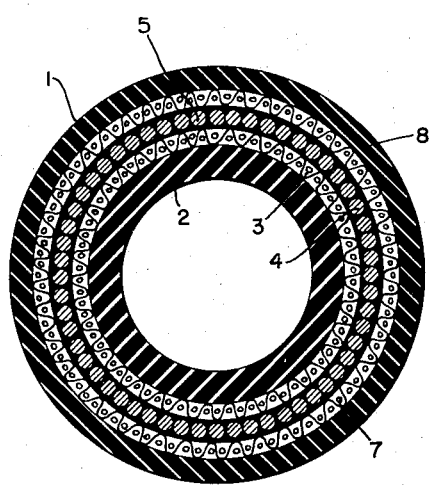

These and other objects of the invention will become apparent from the following description and drawings in which:

Fig. 1 is a sectional view of a hose constructed according to the present invention; and Fig. 2 is an end view of the hose in Fig. 1 further illustrating the relationship of the components of construction of the hose.

As previously mentioned, the increased speed of travel has resulted in placing hydraulic brake hose in more and more severe operating environments. As higher speeds, heavier cars and decreased wheel size, and therefore decreased brake area, have come about, hydraulic systems have been required to withstand greater pressures applied more suddenly and for longer periods. Thus, since according to the familiar law, hydraulic pressure is exerted equally in all directions, high burst strength, tensile and adequate elongation must be provided by the materials of construction of the hose. In addition, high temperatures, abrasive materials and moisture normally encountered in service put additional resistance requirements on the hose materials. The present invention provides a hose composed of materials which provide a superior hose in the above respects as will be seen from the following detailed description.

One material which might be used in hydraulic brake hose because of its attractively low cost and yet its high tensile and burst strength is regenerated cellulose. This material is available under a number of names and produced by a number of processes. Perhaps the most well known of the regenerated celluloses is viscose rayon, commonly referred to merely as rayon. Another regenerated cellulose is sold under the trade name Fortisan. There are, of course, others which are similar to the above materials. This invention contemplates the inclusion of any regenerated cellulose. Regenerated cellulose possesses great strength under normal conditions and braided fabrics made therefrom would seem to offer distinct advantages in hydraulic hose construction. However, regenerated cellulose exhibits a sharp loss in strength when subjected to moisture. Since the fabric elements of a hydraulic brake hose may come into contact with moisture during service, usually due to an abrasion or cutting of the outer elastomer coating on the hose, it has heretofore been felt that the risk of brake system failure from this cause was too great to permit the use of regenerated cellulose in commercial hose. It is well known that the hose in an automotive brake system is the critical element and it must be entirely trustworthy. Hence, due to its lack of wet strength, rayon or other regenerated cellulose has not been adopted for hydraulic hose in braking systems even though, in the experience of the inventor, the normal strength of rayon fabric is far superior to, and rayon costs less than, the best available grade of cotton, which is commonly used in commercial hose as a strength element.

In search for a hydraulic hose of greater resistance to the stresses of service, it has been discovered that fabrics of regenerated cellulose may be advantageously used with a minimum concern over the wet strength problem by providing a specially constructed protective cover therefor composed of elastomer-coated material having low water absorption properties, high tensile strength and elongation. With a normal hose construction, which includes generally two braided fabric plies with a rubber layer sandwiched between them, flexure during service often causes the development of small holes in the sandwiched rubber layer through which water may penetrate if the outer cover of the hose is cut, gouged or abraded through. However, in a construction according to the present invention, the inclusion of a special ply of elastomer coated, low water-absorptive, high-strength material, such as will be later described, has been found to provide greater resistance to such breakdown both in the elastomer coat and the coated material, and hence to minimize the possibility of the occurrence of small holes permitting moisture to pass through to the inner ply of regenerated cellulose as well as effectively preventing, due to its low water-absorption property, wicking of water through the inner ply. It has been found that in particular the use of nylon, which is a synthetic linear polyamide, for such a purpose not only provides a moisture barrier for the inner cellulose ply but also, when utilized according to the invention, gives added longitudinal strength, greater coupling strength, and retains the required flexibility and elongation properties of the hose. Referring to the drawings, a clearer understanding of the invention can be obtained from a description of the specific embodiment illustrated therein.

In Fig. 1, a hydraulic hose made according to the present invention is indicated generally by the numeral 1. The hose has an inner elastomeric tube 2 which is covered by a braided fabric layer 3 made of regenerated cellulose, for example, viscose rayon. The weave of the fabric layer 3 may be varied as necessary, the braided structure being preferred for resistance to hose expansion and added burst strength. Laid upon layer 3 is a layer 4 composed of nylon elements 5 coated with an elastomer 6. As can be seen in Fig. 1, the closely spaced elements 5 are arranged parallel to each other and substantially parallel to the longitudinal axis of the hose. This longitudinal arrangement provides increased resistance to lengthwise stresses while at the same time the cords, being closely spaced, provide a moisture barrier to protect the inner cellulose layer in addition to resisting breakdown due to flexure as previously mentioned. A material such as nylon which possesses substantial elongation is to be preferred for this purpose over materials such as glass fibers since the latter are too brittle to provide the necessary elongation without fracture of the elements during high pressure service. A second braided layer 7 is placed over the layer 4 to provide additional burst strength in the hose. It is possible in some instances to eliminate the layer 7 when a hose of smaller outside diameter is required and the pressures to which the hose is subjected are not above the tolerance of the two-ply hose construction. The fabric in layer 7 may be made of cotton, regenerated cellulose, or other materials. The preferred form being the use of cotton since it has good strength characteristics, although considerably inferior to regenerated cellulose, and is not as severely affected by moisture as rayon and similar materials are. Lastly the whole laminated structure is covered by a relatively thin protective coat 8 of elastomer. A variety of elastomers may be utilized in the hose, neoprene being commonly used. The laminated assembly is vulcanized into an integral structure to produce the final commercial product.

The same hose construction can be seen in end section in Fig. 2. The closely spaced arrangement of the parallel and longitudinally disposed elements 5 in the layer 4 can be clearly seen. It is obvious that if a cut occurs in the elastomeric cover 8, moisture which tends to wick through the fabric layer 7 will be effectively halted by the elastomer-coated, non-hygroscopic elements in layer 4. If a cut in a hydraulic hose penetrates through the outer three layers to the inner ply, the hose can be expected to fail either by pulling apart longitudinally under elongation stress or by bursting due to wall pressure. Under such circumstances the greater strength of the regenerated cellulose provides interim protection which increases the probability of a slow failure of the hose which warns the operator of the vehicle rather than a sudden rupture without warning. In many cases, the inner cellulose layer provides a safety feature similar to the controlled slow leak found in safety shields used in pneumatic tubeless tires. This and other great advantages of the present invention have been confirmed by tests, typical of those conducted on commercial hose, the results of which are indicated below.

In the leak test data shown in Table 1, construction A is a typical commercial hydraulic brake hose structure having its plies in a cotton-neoprene-cotton sequence. Construction B is made according to the present invention and has three plies in a rayon-nylon-cotton sequence when taken from inner to outer fabric plies.

The samples were aged 72 hours at approximately 160° F. and the outer covers were cut. The cutting of the cover is merely a convenience in order to detect a leak easily since otherwise it is necessary to wait for sufficient leakage to form a blister beneath the outer elastomeric cover to permit leak detection. The samples were fitted with couplings at either end and the failure time recorded with reference to each coupling. Failure was recorded as a leak, usually an oozing of fluid at the cut, and, in progressive failure, a drip. For convenience of comparison, the time at the occurrence of a leak at the male coupling of the first sample of construction A is taken as one unit and all other times are expressed comparatively to the nearest tenth unit.

TABLE 1

*Leak test*

| Pressure, p.s.i. | Sample | Construction A | | | |
|---|---|---|---|---|---|
| | | M Coupling | | F Coupling | |
| | | Leak | Drip | Leak | Drip |
| 1,800 | 1 | 1 | 2 | 1 | 2.3 |
| 1,800 | 2 | 1.6 | 7.7 | 19.0 | 19.9 |
| 1,800 | 3 | 0.5 | 1.8 | 0.8 | 2.6 |
| 3,000 | 1 | (¹) | (¹) | (¹) | (¹) |
| 3,000 | 2 | (¹) | (¹) | (¹) | (¹) |
| 3,000 | 3 | (¹) | (¹) | (¹) | (¹) |

| Pressure, p.s.i. | Sample | Construction B | | | |
|---|---|---|---|---|---|
| | | M Coupling | | M Coupling | |
| | | Leak | Drip | Leak | Drip |
| 1,800 | 1 | (²) | (²) | (²) | (²) |
| 1,800 | 2 | (²) | (²) | (²) | (²) |
| 3,000 | 1 | 11.5 | (³) | 29.2 | (³) |
| 3,000 | 2 | 13.9 | (³) | 14.6 | 51.5 |

¹ No test.
² No failure after approximately 90 time units.
³ Leak but no drip after approximately 90 time units.

The greater strength of the inventive construction B and its resistance to rapid failure is clearly seen from the foregoing data.

A comparison of two constructions was made from the standpoint of volumetric expansion of the hose, obviously a critical factor in a hydraulic system, and flex life which is of particular interest from the automotive standpoint. Expansion was measured in cubic centimeters and based on samples which had a 15 inch cut length and an internal diameter of ⅛ inch. Flex life was determined under the conditions of a 15-inch hose with 1¾ inch slack being rotated about one fixed end on an 8-inch diameter circle at the rate of 800±10 r.p.m. In the data shown in Table 2, construction C is a hose having a cotton-nylon-cotton sequence of plies while construction D has a rayon-nylon-cotton structure according to the present invention. For ease of comparison, the expansion of sample 1, construction C at 1000 lbs. is taken as 1 unit and all other expansions stated comparatively to the nearest hundredth. The flex life figure is an average of 8 samples of each construction, the average for construction C taken as 100.

TABLE 2

*Expansion*

| Exp. at— | Construction C | | Construction D | |
|---|---|---|---|---|
| | Sample 1 | Sample 2 | Sample 1 | Sample 2 |
| 1,000 p.s.i. | 1 | 0.97 | 0.70 | 0.75 |
| 1,500 p.s.i. | 1.27 | 1.25 | 0.87 | 0.92 |

| Flex Life Construction C | Construction D |
|---|---|
| 100 | 122.0 |

From the above, the superiority of regenerated cellulose over cotton is demonstrated.

Other tests conducted reveal in similar manner the surprising advantages of the hose construction of the present invention over the presently available commercial hose. For example, a hot tower test was conducted on the hose construction indicated with reference to Table 1. In this test the hose was suspended from one end with a 100 lb. weight attached to the other end. The ambient temperature was controlled at approximately 300° F. to simulate temperature conditions due to brake generated heat. The time to failure (coupling pulled off) was then recorded. Again, for ease of comparison, the time to failure of sample 1, construction A, is taken as one unit and all other times expressed comparatively to the nearest tenth unit.

TABLE 3

Heat test

| Construction A | | Construction B | |
|---|---|---|---|
| Sample 1 | 1.0 | Sample 1 | 4.8 |
| Sample 2 | 1.2 | Sample 2 | 18.1 |

It is obvious from the foregoing that construction B, made according to the present invention, is clearly superior to typical constructions used in the commercial field.

While certain representative embodiments and details have been shown for the purpose of illustrating the invention, it will be apparent to those skilled in this art that various changes and modifications may be made therein without departing from the spirit or scope of the invention.

I claim:

1. A hose for use in high pressure fluid systems comprising an elastomeric fluid impervious inner tube, a fabric reinforcing layer of regenerated cellulose superimposed thereon, an elastomer coated layer of nylon elements about the said tube and said fabric layer, said elements being closely spaced with respect to each other and substantially parallel with each other and oriented substantially parallel to the longitudinal axis of the said inner tube, and an outer elastomeric fluid impervious tubular cover about the whole.

2. A hose as claimed in claim 1 in which the regenerated cellulose is rayon.

3. A hose for use in high pressure fluid systems comprising an elastomeric fluid impervious inner tube, a first fabric reinforcing layer of regenerated cellulose superimposed thereon, an elastomer coated layer of nylon elements about the said tube and said fabric layer, said elements being closely spaced with respect to each other and substantially parallel with each other and oriented substantially parallel to the longitudinal axis of the said inner tube, a second fabric layer superimposed on the said nylon layer, and an outer elastomeric fluid impervious tubular cover about the whole.

4. A hose as claimed in claim 3 in which the regenerated cellulose is rayon.

5. A hose as claimed in claim 3 in which the said second fabric layer is composed of cotton.

6. A hose for use in high pressure fluid systems comprising an elastomeric fluid impervious inner tube, a first fabric reinforcing layer composed of rayon superimposed thereon, an elastomer coated layer of nylon elements about the said tube and the said fabric layer, said elements being closely spaced with respect to each other and substantially parallel with each other and substantially parallel to the longitudinal axis of the said inner tube, a second fabric reinforcing layer composed of cotton superimposed on said nylon layer, and an outer elastomeric fluid impervious tubular cover about the whole.

7. A hose for use in high pressure fluid systems comprising an elastomeric fluid impervious inner tube, a fabric reinforcing layer of regenerated cellulose superimposed thereon, an elastomer coated layer of nylon elements immediately about said tube and said fabric layer, said elements being in closely-spaced substantially parallel relationship to each other and oriented substantially parallel to the longitudinal axis of said inner tube, and an outer elastomeric cover about the whole.

8. A hose as claimed in claim 7 including a second fabric reinforcing layer composed of cotton and superimposed on said layer of nylon elements and covered by said outer elastomeric cover.

References Cited in the file of this patent

UNITED STATES PATENTS

| 2,461,594 | Flounders | Feb. 15, 1949 |
| 2,652,093 | Burton | Sept. 15, 1953 |
| 2,747,616 | De Ganahl | May 29, 1956 |
| 2,749,643 | Scott | June 12, 1956 |